United States Patent
Bae et al.

(10) Patent No.: US 11,958,446 B1
(45) Date of Patent: Apr. 16, 2024

(54) MAT CLEANING DEVICE

(71) Applicant: Sang Cheol Bae, Daegu (KR)

(72) Inventors: Sang Cheol Bae, Daegu (KR); Hyun Il Bae, Daegu (KR)

(73) Assignee: Jae-Hoon Choi, Frisco, TX (US)

( * ) Notice: Subject to any disclaimer, the term of this patent is extended or adjusted under 35 U.S.C. 154(b) by 18 days.

(21) Appl. No.: 17/978,327

(22) Filed: Nov. 1, 2022

(30) Foreign Application Priority Data

Oct. 14, 2022 (KR) .................. 10-2022-0131900

(51) Int. Cl.
| | |
|---|---|
| *B08B 3/02* | (2006.01) |
| *B08B 5/04* | (2006.01) |
| *B08B 7/04* | (2006.01) |
| *B08B 13/00* | (2006.01) |
| *B60S 3/00* | (2006.01) |
| *D06G 1/00* | (2006.01) |
| *F26B 3/04* | (2006.01) |
| *F26B 5/08* | (2006.01) |
| *F26B 5/12* | (2006.01) |

(52) U.S. Cl.
CPC .............. *B60S 3/00* (2013.01); *B08B 3/022* (2013.01); *B08B 5/043* (2013.01); *B08B 7/04* (2013.01); *B08B 13/00* (2013.01); *D06G 1/00* (2013.01); *F26B 3/04* (2013.01); *F26B 5/08* (2013.01); *F26B 5/12* (2013.01)

(58) Field of Classification Search
CPC ......... B08B 3/022; B08B 3/041; B08B 3/123; B08B 5/023; B08B 5/043; B08B 5/046; B08B 1/02
See application file for complete search history.

(56) References Cited

U.S. PATENT DOCUMENTS

2008/0189902 A1 *   8/2008   Bae .................. B08B 5/043
                                                    15/300.1

FOREIGN PATENT DOCUMENTS

| EP | 1289402 B1 * | 4/2005 | .............. A47L 11/14 |
|---|---|---|---|
| JP | 202170557 A | 5/2021 | |
| JP | 2021070557 A | 5/2021 | |
| KR | 10-2002-0076500 A | 10/2002 | |
| KR | 1020070038615 A | 4/2007 | |
| KR | 1020070060590 A | 6/2007 | |
| KR | 1020070060590 A | 7/2007 | |

(Continued)

OTHER PUBLICATIONS

KR20160109470—Machine Translation (Year: 2016).*
KR101779820—Machine Translation (Year: 2017).*

*Primary Examiner* — Marc Lorenzi
(74) *Attorney, Agent, or Firm* — NKL Law; Byungwoong Park (57) ABSTRACT

Proposed is a mat cleaning device. The mat cleaning device includes a casing which constitutes an exterior of the mat cleaning device, a washing water spray nozzle which is disposed on one side of the casing and sprays washing water on the mat, a drive motor which is disposed inside the casing and provides power, a plurality of rollers which is rotated by the power supplied from the drive motor and transfers and washes the mat, a vacuum pump which forms vacuum pressure, a vacuum suction means which sucks moisture and foreign matter on a surface of a washed mat by using the vacuum pressure formed by the vacuum pump, and a centrifugation chamber which provides the vacuum pressure formed by the vacuum pump to the vacuum suction means.

2 Claims, 8 Drawing Sheets

(56) References Cited

FOREIGN PATENT DOCUMENTS

KR      20160109470 A * 9/2016
KR        101779820 B1   10/2017

* cited by examiner

MAT CLEANING DEVICE

CROSS REFERENCE TO RELATED APPLICATION

The present application claims priority to Korean Patent Application No. 10-2022-0131900, filed Oct. 14, 2022, the entire contents of which are incorporated herein for all purposes by this reference.

BACKGROUND OF THE INVENTION

Field of the Invention

The present disclosure relates generally to a mat cleaning device. More particularly, the present disclosure relates to a mat cleaning device which dries a washed mat by using hot air discharged from a vacuum pump provided to remove moisture of the washed mat such that the installation costs of a heating device are not incurred, and allows an end part of the mat sucked on a vacuum suction means to be efficiently discharged by a first pressing roller to which friction members are attached.

Description of the Related Art

A mat installed on the floor of a vehicle is used to facilitate cleaning of the inside of the vehicle by preventing various types of foreign matter inside of the vehicle from coming into direct contact with the floor of the vehicle.

A mat cleaning device is used to conveniently clean such a mat for a vehicle. However, the mat cleaning device for a vehicle only washes a mat but does not dry a washed mat, and accordingly, when the washed mat is used in the vehicle immediately after the mat is washed, moisture is evaporated from the washed mat inside the vehicle, which causes the use of the mat cleaning device to be avoided.

Accordingly, to improve this inconvenience, a mat cleaning device that performs both washing and drying has been introduced. The mat cleaning device, which performs both washing and drying, washes a mat and then dries the surface of the washed mat by using a heating device.

However, the cost of electricity consumed by the use of the heating device is considerable, putting a burden on users.

Accordingly, the development of a new type of mat cleaning device that can reduce energy consumption is urgently required.

DOCUMENT OF RELATED ART (Patent Document 1) Korean Patent Application Publication No. 10-2002-0076500

SUMMARY OF THE INVENTION

Accordingly, the present disclosure has been made keeping in mind the above problems occurring in the related art, and the present disclosure is intended to propose a mat cleaning device which dries a washed mat by using hot air discharged from a vacuum pump provided to remove moisture of the washed mat.

In addition, the present disclosure is intended to propose a mat cleaning device which efficiently discharges an end part of the mat sucked on a vacuum suction means.

In order to achieve the above objectives, according to one aspect of the present disclosure, there is provided a mat cleaning device which washes and dries a mat, the device including: a casing which constitutes an exterior of the mat cleaning device; a washing water spray nozzle which is disposed on one side of the casing and sprays washing water on the mat; a drive motor which is disposed inside the casing and provides power; a plurality of rollers which is rotated by power supplied from the drive motor and transfers and washes the mat; a vacuum pump which forms vacuum pressure; a vacuum suction means which sucks moisture and foreign matter on a surface of a washed mat by using the vacuum pressure formed by the vacuum pump; and a centrifugation chamber which provides the vacuum pressure formed by the vacuum pump to the vacuum suction means and centrifuges the moisture and foreign matter sucked by the vacuum suction means.

In addition, according to the present disclosure, the centrifugation chamber may include: a first chamber coupled with the vacuum pump at an upper part of the first chamber such that the first chamber and the vacuum pump communicate with each other, with a spiral vortex guide being provided inside the first chamber; a second chamber coupled with a vacuum tube, which is coupled with the vacuum suction means, at an upper part of the second chamber, wherein a first partition wall is formed between the second chamber and the first chamber, and a first through hole is formed under the first partition wall such that water and foreign matter centrifuged in the first chamber are introduced into the second chamber; and a third chamber coupled with a drainpipe at one side of the third chamber, wherein a second partition wall may be formed between the third chamber and the second chamber, and a second through hole may be formed under the second partition wall, wherein a check valve may be coupled to the second through hole, and when operation of the vacuum pump stops, the check valve may be opened by pressure of water filled in the second chamber, so that the water and foreign matter stored in the second chamber may be discharged to the drainpipe.

Additionally, according to the present disclosure, the vacuum suction means may include: a vacuum chamber which is connected to the centrifugation chamber and provides suction force thereto; and a bottleneck part which is formed on an upper part of the vacuum chamber, wherein the bottleneck part may be formed to be smaller in a width than the vacuum chamber so as to increase suction efficiency, and a plurality of vacuum suction slots may be formed in an upper surface of the bottleneck part.

Furthermore, according to the present disclosure, the device may further include: a hot air supply means which has a first end coupled with a discharge hole of the vacuum pump and has a second end disposed under the washed mat so as to dry the mat by using air discharged from the vacuum pump.

In addition, according to the present disclosure, the plurality of rollers may include: a guide roller which rearward transfers the washed mat by receiving power from the drive motor; and a first pressing roller which is disposed at a rear side of an upper part of the guide roller and presses the mat transferred by the guide roller to an upper part of the bottleneck part while the first pressing roller is in contact with the guide roller.

Furthermore, according to the present disclosure, friction members may be attached on a surface of the first pressing roller.

Additionally, according to the present disclosure, the friction members may be attached on the first pressing roller by being spaced at predetermined intervals apart from each other in a longitudinal direction of the first pressing roller.

According to the mat cleaning device of the present disclosure, the installation costs of a heating device used for drying the mat can be prevented.

In addition, according to the mat cleaning device of the present disclosure, the end part of the mat sucked on the vacuum suction means can be efficiently discharged.

Furthermore, according to the mat cleaning device of the present disclosure, driving power required to rotate the pressing roller can be reduced.

In addition to the above-described effects, the specific effects of the present disclosure will be described together while explaining specific details for operating the mat cleaning device of the present disclosure invention below.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION OF THE INVENTION

Hereinafter, the embodiment of the present document will be described with reference to the accompanying drawings. However, this is not intended to limit the technology described in this document to a specific embodiment, and it should be understood that various modifications, equivalents, and/or alternatives of the embodiment of this document are included. In connection with the description of the drawings, like reference numerals may be used for like components.

In addition, expressions such as "first" and "second" used in this document may modify various elements regardless of order and/or importance, and are used only to distinguish one element from another element but do not limit the corresponding components. For example, "first part" and "second part" may represent different parts regardless of order or importance. For example, without departing from the scope of the claims described in this document, the first component may be named as the second component, and similarly, the second component may also be named as the first component.

In addition, terms used in this document are used only to describe a specific embodiment, and may not be intended to limit the scope of other embodiments. A singular expression may include a plural expression unless the context clearly dictates otherwise. Terms used herein, including technical or scientific terms, may have the same meanings as commonly understood by those skilled in the art described in this document. Among the terms used in this document, terms defined in a general dictionary may be interpreted to have the same or similar meaning as meaning in the context of the related art, and unless explicitly defined in this document, are not interpreted as deal or excessively formal meanings. In some cases, even terms defined in this document cannot be construed to exclude the embodiment of the present document.

Figure 1:
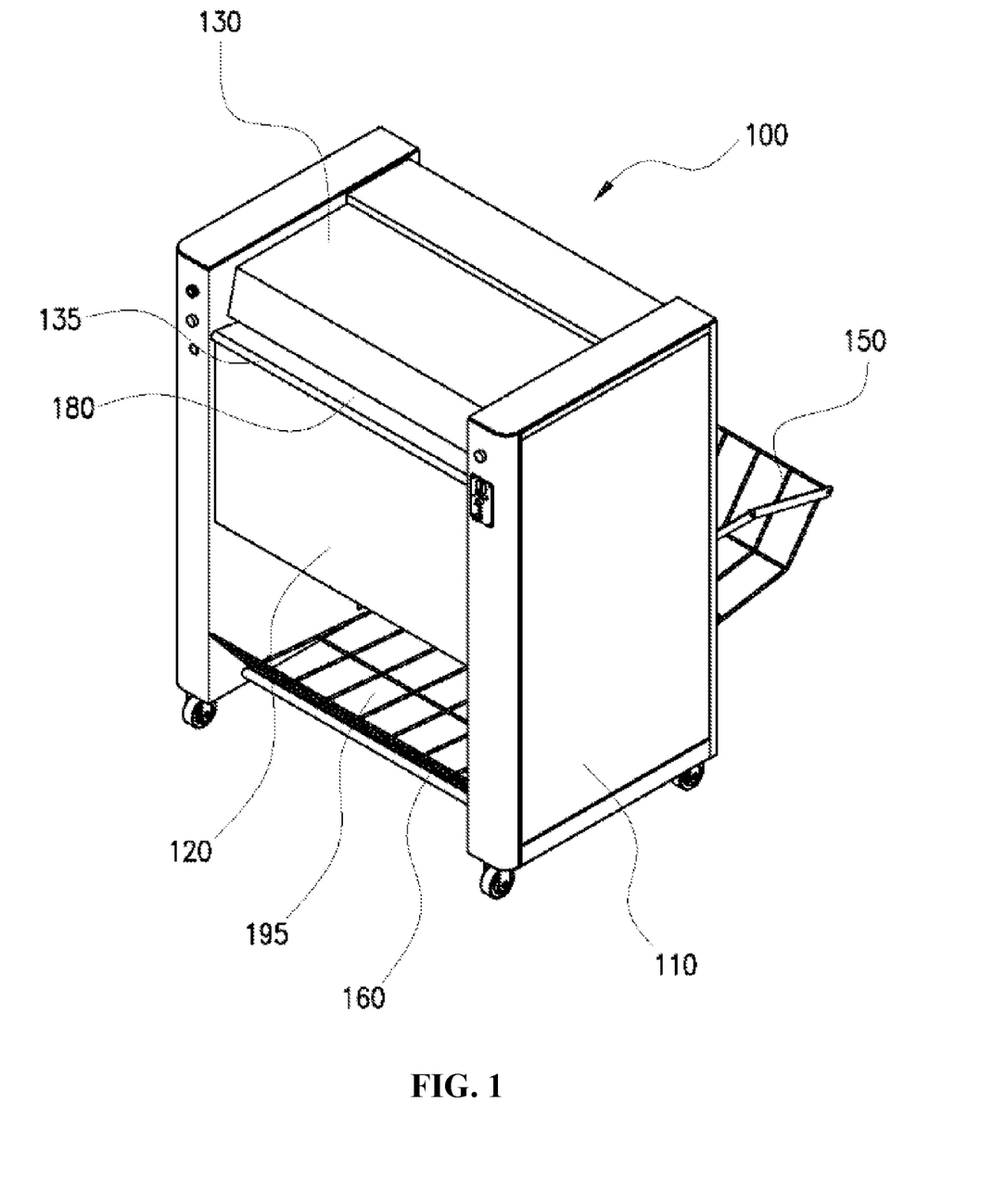
FIG. 1 is a perspective view of a mat cleaning device according to the present disclosure.
Figure 2:
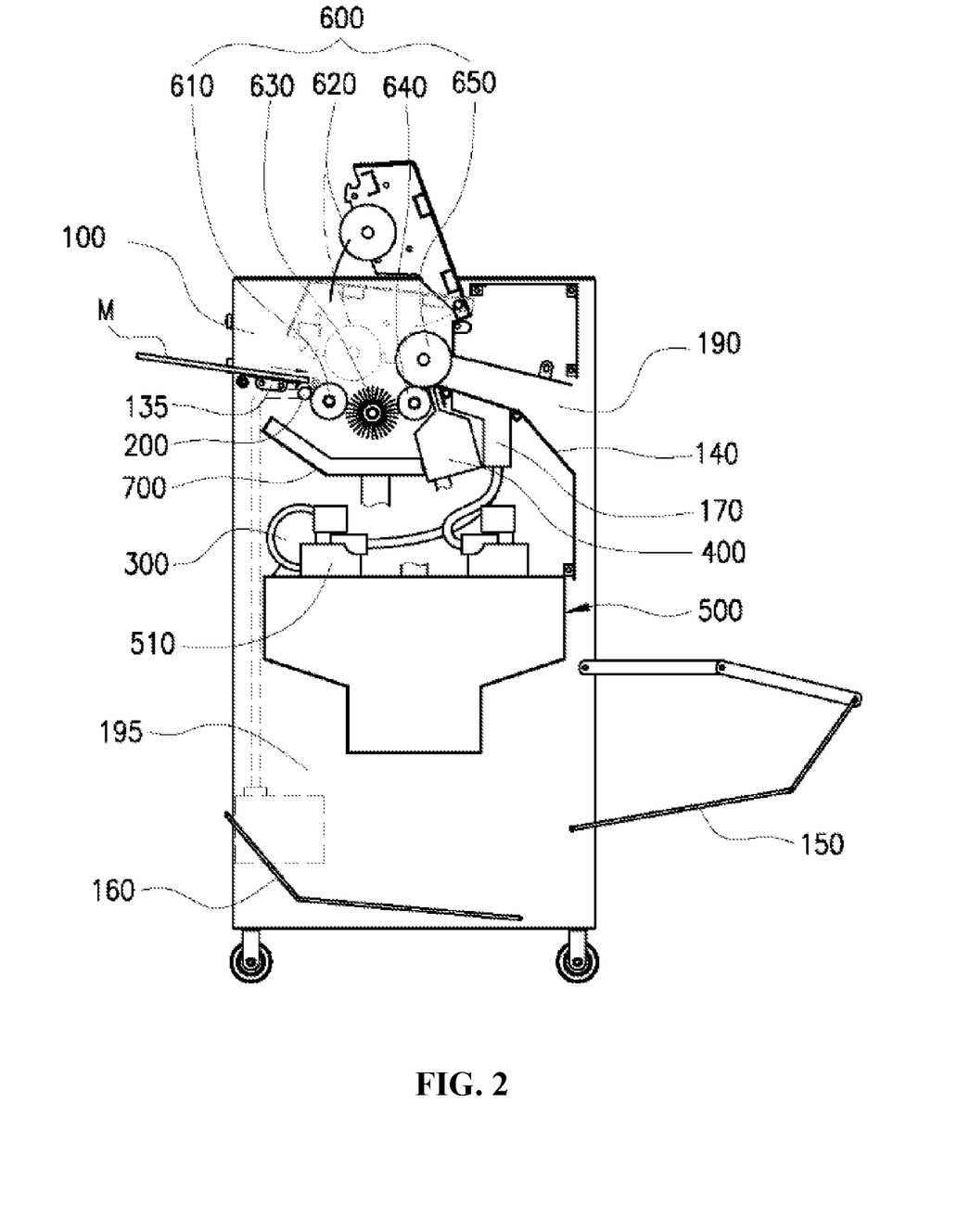
FIG. 2 is a sectional view of the mat cleaning device according to the present disclosure.

FIG. 1 is a perspective view of a mat cleaning device according to the present disclosure, and FIG. 2 is a sectional view of the mat cleaning device according to the present disclosure.

The following description will be made with reference to FIGS. 1 and 2.

The mat cleaning device according to the present disclosure performs cleaning and drying. The mat cleaning device according to the present disclosure includes a casing 100, a washing water spray nozzle 200, a drive motor 300, a plurality of rollers 600, a dryer 170, a water collector 700, a vacuum suction means 400, a centrifugation chamber 500, and a controller (not shown).

The casing 100 constitutes the exterior of the mat cleaning device and includes side parts 110, a front part 120, an upper cover 130, a discharge guide plate 140, a mat stacking guide 150, and a mat stacking stand 160.

The side parts 110 constitute the opposite side surfaces of the mat cleaning device.

The front part 120 is coupled to the front center part of the side parts 110 to constitute the front surface of the casing 100 and has an opening part 195 formed under the front part 120. The mat stacking stand 160 to be described later is installed in the opening part 195, and mats M to be discharged forward are stacked on the mat stacking stand 160.

An introduction guide plate 135 may be formed on a side of the rear surface of the front part 120. The introduction guide plate 135 guides each of the mats M to be introduced such that the mat is introduced to the rollers 600.

The upper cover 130 is coupled rotatably to the upper part of each of the side parts 110 such that sufficient space for performing repairs inside the mat cleaning device is secured, thereby facilitating repair work.

An introduction hole 180 into which the mat M is introduced is formed between the front part 120 and the upper cover 130.

The discharge guide plate 140 is coupled to the rear center part of the side parts 110 to constitute the rear surface of the casing 100 and has the opening part 195 formed under the discharge guide plate 140.

A discharge hole 190 to which the mat M is discharged is formed between the discharge guide plate 140 and the upper cover 130.

The mat stacking guide 150 is coupled to the rear lower part of the side parts 110 and guides the forward discharge of the mat M discharged rearward through the discharge guide plate 140.

The mat stacking stand 160 is located between lower parts of the two side parts 110 to be coupled thereto and allows the mats M transferred from the mat stacking guide 150 to be stacked on the mat stacking stand 160.

Accordingly, in the mat cleaning device according to the present disclosure, the introduction and discharge of the mat M are performed at the front of the mat cleaning device, thereby enhancing user convenience.

The drive motor 300 is arranged inside the casing 100 and provides power to drive the various rollers 600 to be described later.

The washing water spray nozzle 200 is disposed on one side of the casing 100 to spray washing water on the surface of the mat M.

The plurality of rollers 600 is rotated by power supplied from the drive motor 300 and transfers and washes the mat M.

The plurality of rollers 600 includes a drive roller 610, a second pressing roller 620, a brush roller 630, a guide roller 640, and a first pressing roller 650.

The drive roller 610 is rotated by receiving power from the drive motor 300 and is disposed behind the introduction guide plate 135. The drive roller 610 transfers the mat M delivered to the introduction guide plate 135 to the brush roller 630 which is adjacent to the drive roller 610.

The second pressing roller 620 is disposed to face the drive roller 610 and transfers the mat M while pressing the mat such that transferring force by the drive roller 610 is transmitted to the mat M.

The brush roller 630 has a brush formed on the surface of the brush roller 630 and washes the surface of the mat M transferred from the drive roller 610.

The guide roller 640 is disposed behind the brush roller 630 and guides the mat M transferred from the brush roller 630 to the discharge guide plate 140.

The first pressing roller 650 functions to press the upper surface of the mat M such that the mat M is pressed to a bottleneck part 430 of the vacuum suction means to be described later. This is intended to ensure that the mat M is efficiently adhered to the bottleneck part 430.

The transmission of power generated by the drive motor 300 to the plurality of rollers 600 is performed through a normal power transmission device, and thus a detailed description thereof will be omitted.

In order to remove moisture of a washed mat M such that a user does not have inconvenience when using the cleaned mat M in a vehicle immediately after cleaning the mat M, the mat cleaning device according to the present disclosure is provided with the vacuum suction means 400.

Figure 3:
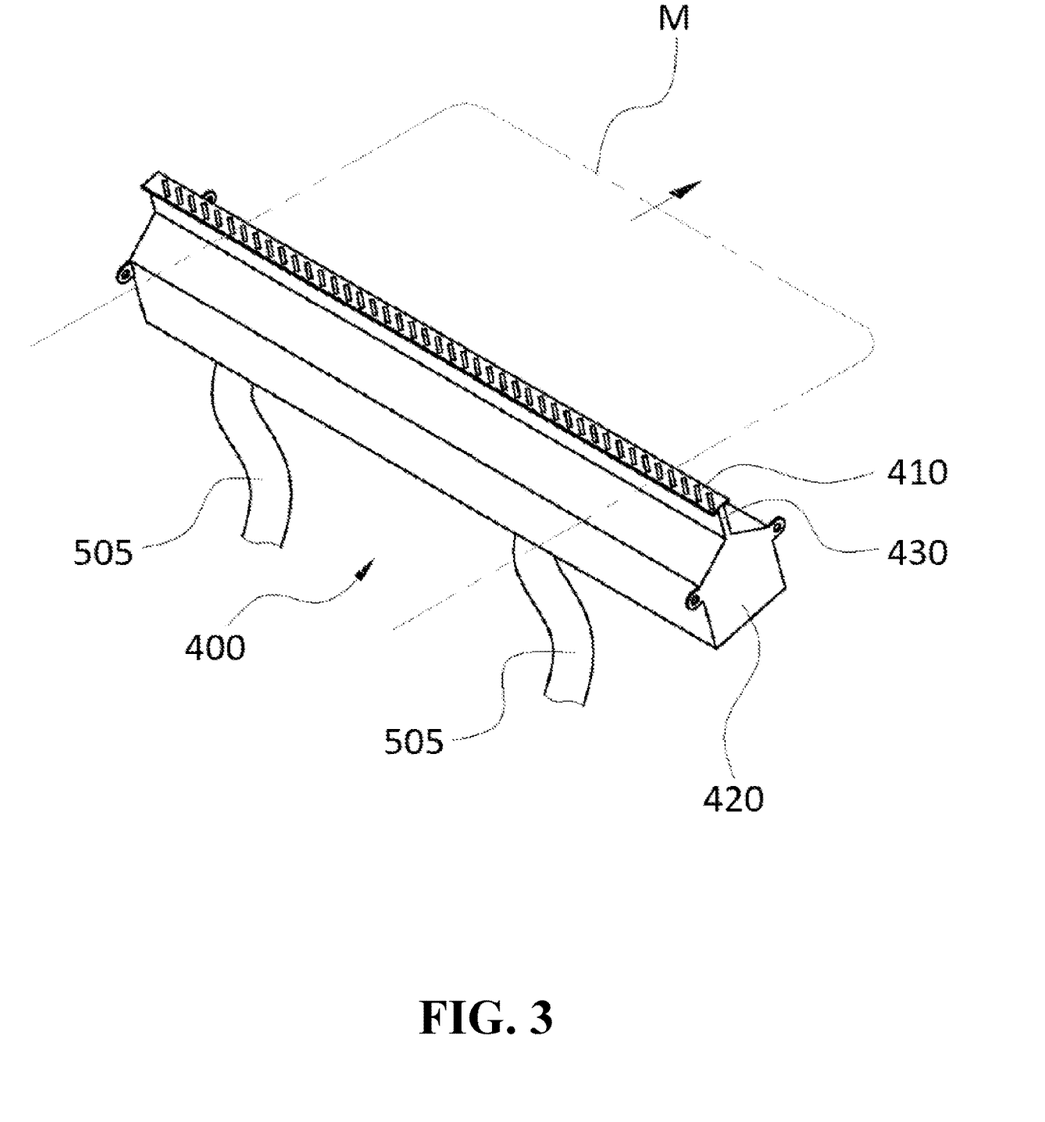
FIG. 3 is a perspective view of a vacuum suction means according to the present disclosure.
Figure 4:
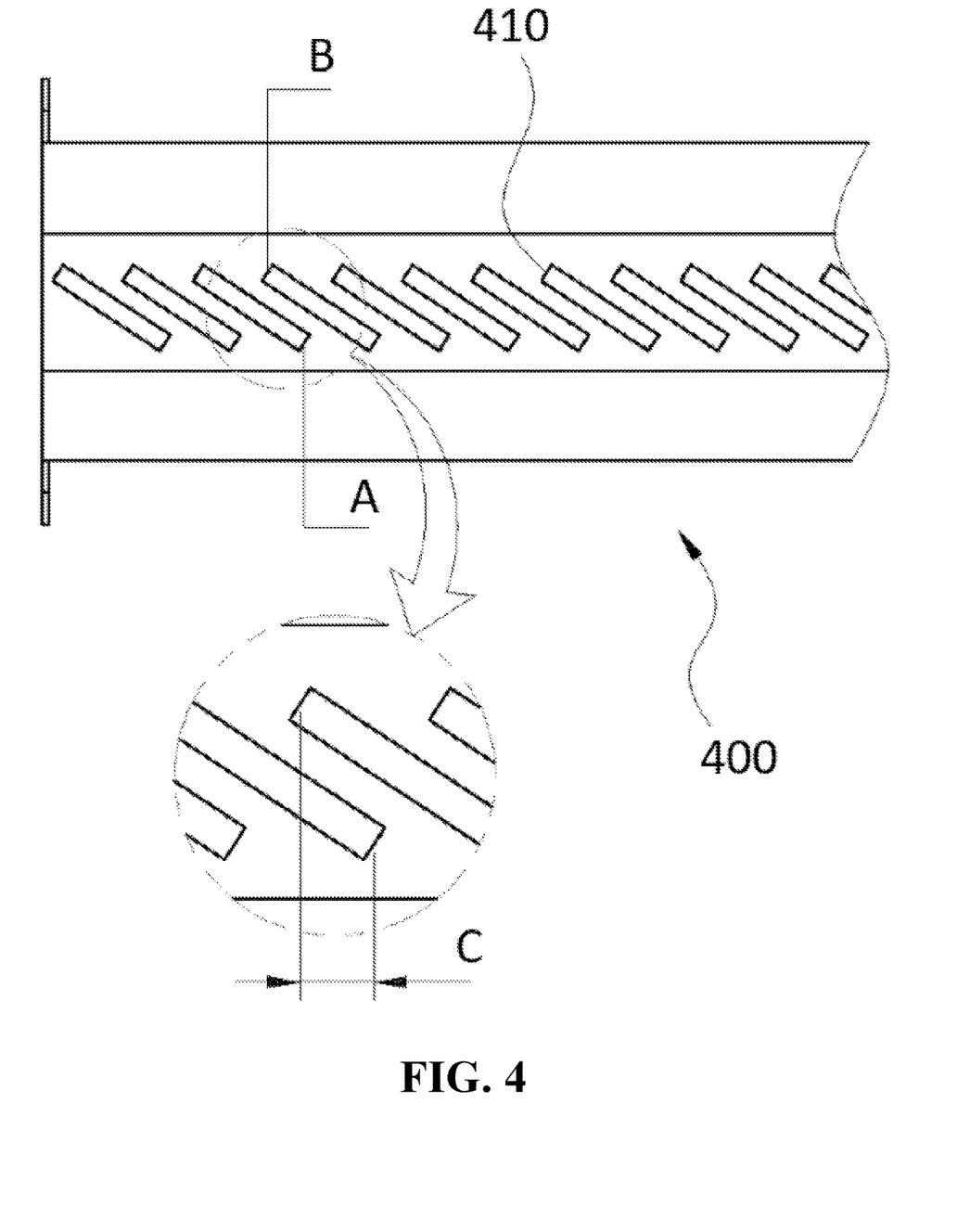
FIG. 4 is a view illustrating the operation of vacuum suction slots according to the present disclosure.

FIG. 3 is a perspective view of the vacuum suction means 400 according to the present disclosure, and FIG. 4 is a view illustrating the operation of vacuum suction slots 410 according to the present disclosure;

The following description will be made with reference to FIGS. 3 and 4.

The vacuum suction means 400 according to the present disclosure performs the vacuum suction of foreign matter and moisture on the surface of the washed mat M.

The vacuum suction means 400 is disposed behind the guide roller 640.

The vacuum suction means 400 includes a vacuum chamber 420 and the bottleneck part 430.

The vacuum chamber 420 is connected to the centrifugation chamber 500 in which a vacuum is created, and provides a suction force.

The bottleneck part 430 is formed on the upper part of the vacuum chamber 420 and is formed to be smaller in a width than the vacuum chamber 420. This is intended to increase the vacuum level of the vacuum suction means 400 so as to increase suction efficiency thereof.

The bottleneck part 430 has a plurality of vacuum suction slots 410 formed on an upper surface thereof. Foreign matter and moisture are sucked through the vacuum suction slots 410.

The plurality of vacuum suction slots 410 is formed to be inclined relative to the introduction direction of the mat M, and the plurality of vacuum suction slots 410 is formed to be spaced by a predetermined interval apart from each other.

The direction of an arrow M shown in FIG. 3 is the introduction direction of the mat M. The vacuum suction slots 410 are formed to be inclined relative to the direction of the arrow M.

This is intended to prevent a part of the mat M from being held in the vacuum suction slots 410. This will be described with reference to FIG. 4.

In a conventional vacuum suction means 400, vacuum suction slots 410 is formed in a direction perpendicular to the introduction direction of a mat M. Various types of protrusions are formed on the surface of the mat M. The protrusions are formed by twisting several layers of yarn, or protrusions made of rubber are formed. When the vacuum suction slots 410 are formed in the direction perpendicular to the introduction direction of the mat M, the protrusions are inserted into the vacuum suction slots 410 and are held by slot walls formed in the introduction direction of the mat M. Eventually, the mat M does not proceed any further and overloads the device.

However, when the vacuum suction slots 410 are formed to be inclined relative to the introduction direction of the mat M as shown in FIG. 4, even if the protrusions of the mat M are inserted into the vacuum suction slots 410, the protrusions can slide along the inclining direction due to the movement of the mat M and can be efficiently removed from the vacuum suction slots 410. Eventually, the mat M is prevented from being held in the slots.

Meanwhile, as shown in FIG. 4, in the mat cleaning device of the present disclosure, an end part A of one vacuum suction slot 410 of the plurality of vacuum suction slots 410 and an end part B of a vacuum suction slot 410 neighboring to the end part A are arranged to be seen to overlap each other by a predetermined width C when seen in the introduction direction of the mat M.

When the vacuum suction slots 410 are formed in a direction perpendicular to the introduction direction of the mat M, a predetermined interval D is present between each of the vacuum suction slots 410. These intervals form blind spots of vacuum suction to which no vacuum suction force is applied.

However, as shown in FIG. 4, the and part A of one vacuum suction slot 410 and the end part B of an adjacent vacuum suction slot 410 form an overlapping section C when seen in the introduction direction of the mat M. When the vacuum suction slots 410 are in this manner, the blind spots of vacuum suction are not present, thereby further improving the quality of drying the mat M.

Figure 5:
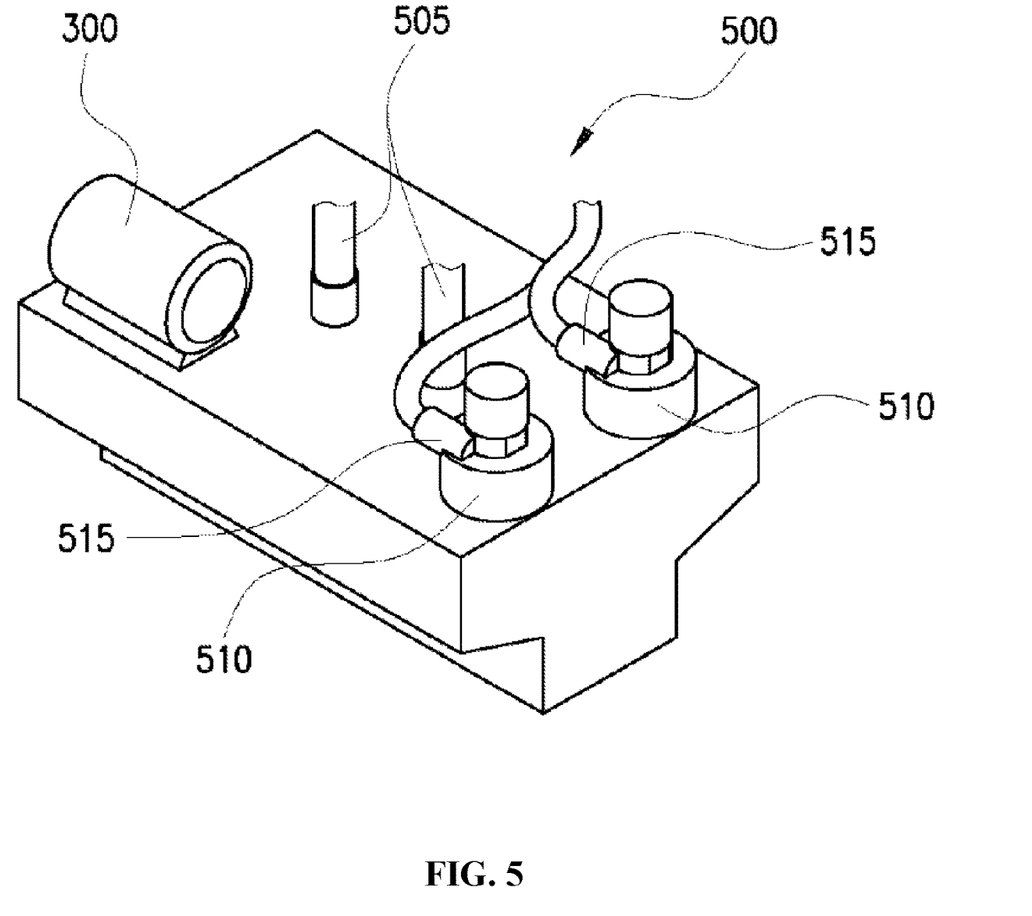
FIG. 5 is a perspective view of a centrifugation chamber according to the present disclosure.
Figure 6:
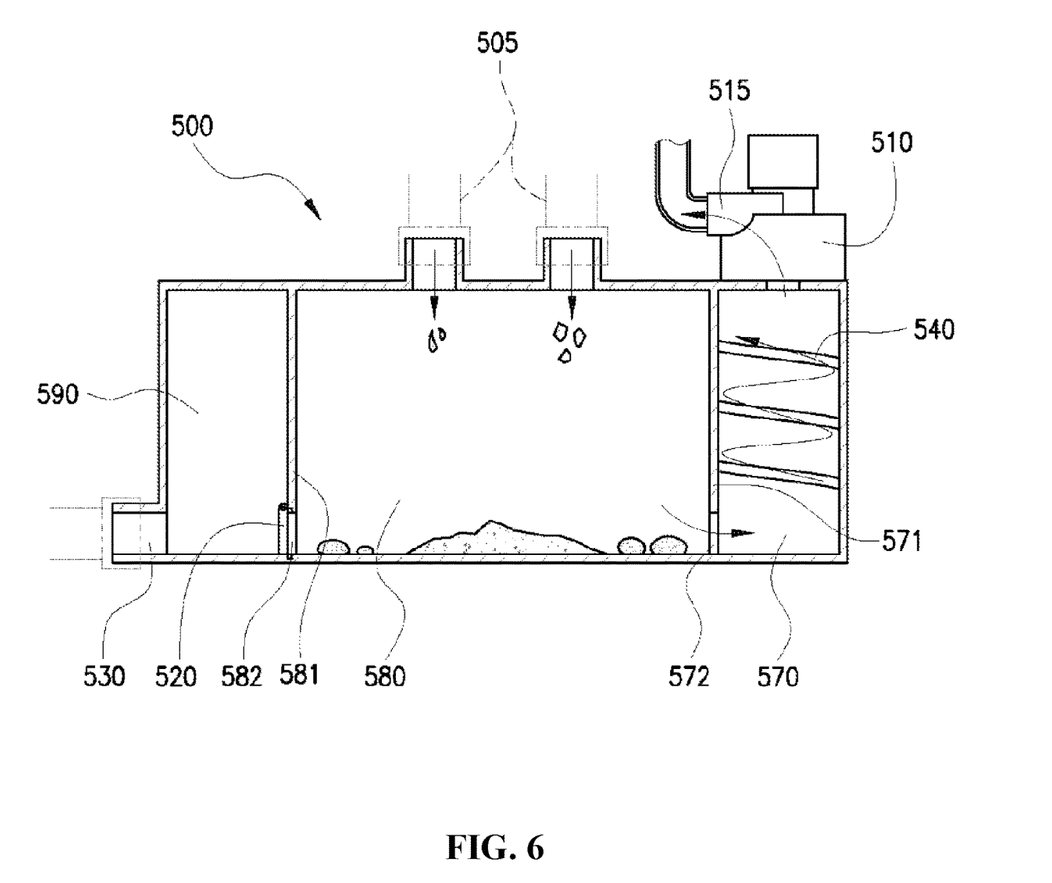
FIG. 6 is a sectional view of the centrifugation chamber according to the present disclosure.

FIG. 5 is a perspective view of the centrifugation chamber 500 according to the present disclosure, and FIG. 6 is a sectional view of the centrifugation chamber 500 according to the present disclosure.

The following description will be made with reference to FIGS. 5 and 6.

The centrifugation chamber 500 forms vacuum pressure, and provides the formed vacuum pressure to the vacuum suction means 400, and functions to centrifuge water and foreign matter sucked by the vacuum suction means 400.

The centrifugation chamber 500 includes a first chamber 570, a second chamber 580, and a third chamber 590.

A vacuum pump 510 is coupled to the upper part of the first chamber 570 to communicate therewith, and a spiral vortex guide 540 is formed on the inner side surface of the first chamber 570. This is intended to effectively centrifuge the introduced foreign matter and moisture.

Light air is separated from relatively heavy moisture and foreign matter by centrifugal force. Air is discharged through a discharge hole 515 formed in the upper part of the vacuum pump 510, and foreign matter and moisture fall to the lower part of the first chamber 570.

A vacuum tube 505 coupled to the vacuum suction means 400 is coupled to the upper part of the second chamber 580, and a first partition wall 571 is formed between the second chamber 580 and the first chamber 570, and a first through hole 572 is formed under the first partition wall 571.

Foreign matter and water are introduced into the second chamber 580 through the vacuum tube 505, and water and foreign matter centrifuged in the first chamber 570 are also introduced into the second chamber 580, and the foreign matter and water are stored in the second chamber 580 before the foreign matter and water are drained to a drainpipe 530.

The first chamber 570 is formed to have a smaller volume than the second chamber 580, increasing vacuum generation efficiency.

A second partition wall 581 is formed between the third chamber 590 and the second chamber 580, and a second through hole 582 is formed under the second partition wall 581.

A check valve 520 is coupled to the second through hole 582, and when the operation of the vacuum pump 510 stops, the check valve 520 is opened by the pressure of water filled in the second chamber 580, and thus the water and foreign matter stored in the second chamber 580 are discharged to the drainpipe 530.

The controller controls a period of time of the operation of the vacuum pump 510. By considering the volume of foreign matter and water which can be received in the first chamber 570 and the second chamber 580, the controller calculates the period of time of the operation of the vacuum pump 510 and controls the operation of the vacuum pump 510 such that the period of time of the operation of the vacuum pump 510 does not exceed the preset period of the operation of the vacuum pump 510.

Figure 7:
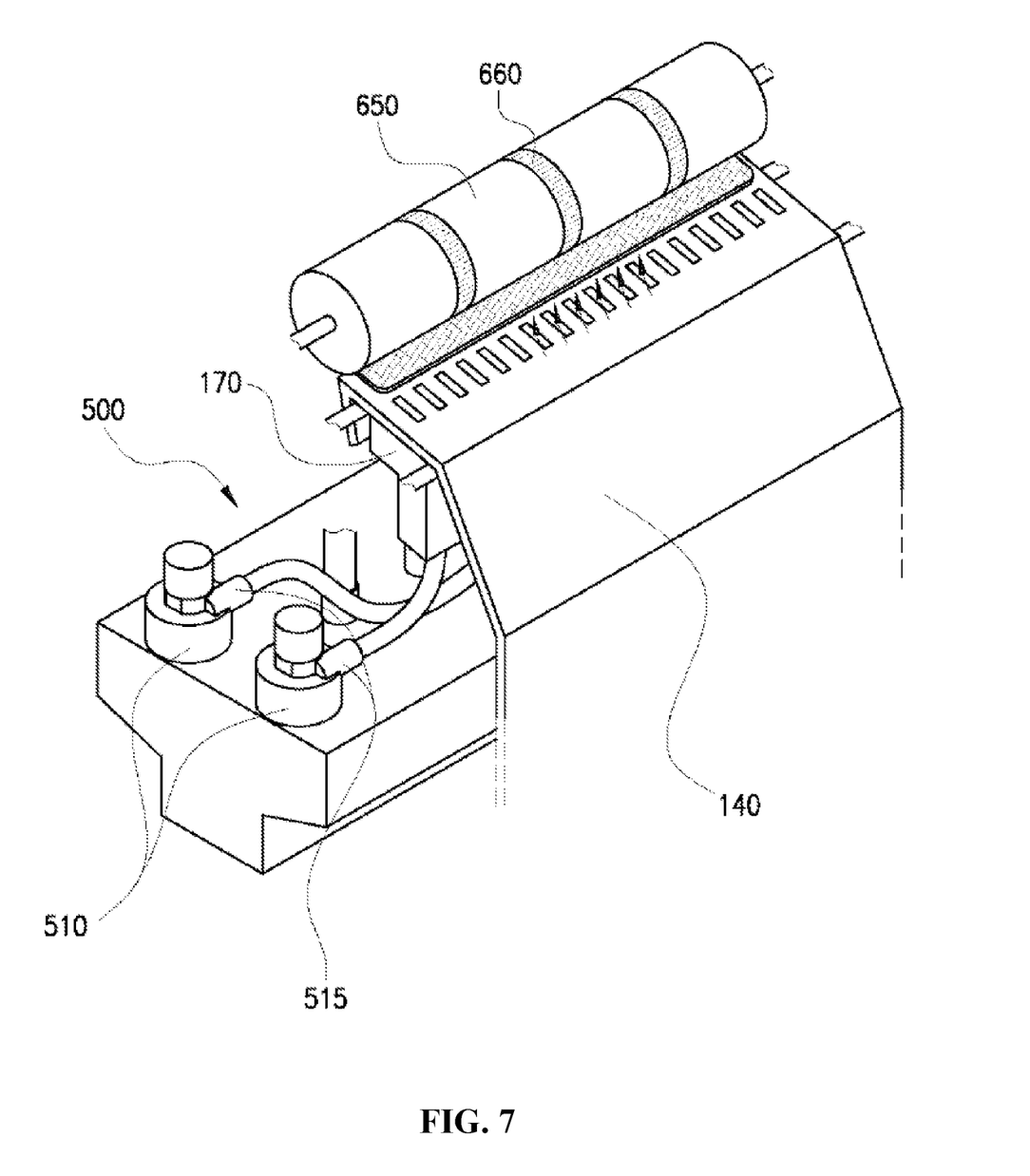
FIG. 7 is a view illustrating a situation in which a hot air supply means dries a washed mat according to the present disclosure.

FIG. 7 is a view illustrating a situation in which a hot air supply means 170 dries a washed mat M according to the present disclosure.

In a conventional technology, in order to dry a washed mat M, a separate heating device is used.

Accordingly, users feel the burden of electricity bills.

In the mat cleaning device of the present disclosure, the discharge air of the vacuum pump 510 is used to remove moisture of a washed mat M without the use of a separate heating device.

In the conventional technology, the vacuum pump 510 is used only to remove moisture of a washed mat M. Accordingly, air discharged from the vacuum pump 510 is discharged to the atmosphere.

When a vacuum is formed inside the vacuum pump 510, air introduced from the outside passes through the second chamber 580, and particularly, the vortex guide 540, and is heated due to friction with the vortex guide 540. As a result, the air discharged to the discharge hole 515 of the vacuum pump 510 is considerably hot.

In order to use air discharged through the discharge hole 515, the mat cleaning device of the present disclosure is provided with the hot air supply means 170.

The hot air supply means 170 has a first end coupled to the discharge hole 515 of the vacuum pump 510 and has a second end disposed under a washed mat so as to dry the washed mat M by air discharged from the vacuum pump 510.

Accordingly, the mat cleaning device according to the present disclosure can dry a washed mat M without burdening a user with excessive electricity expenses.

Figure 8:
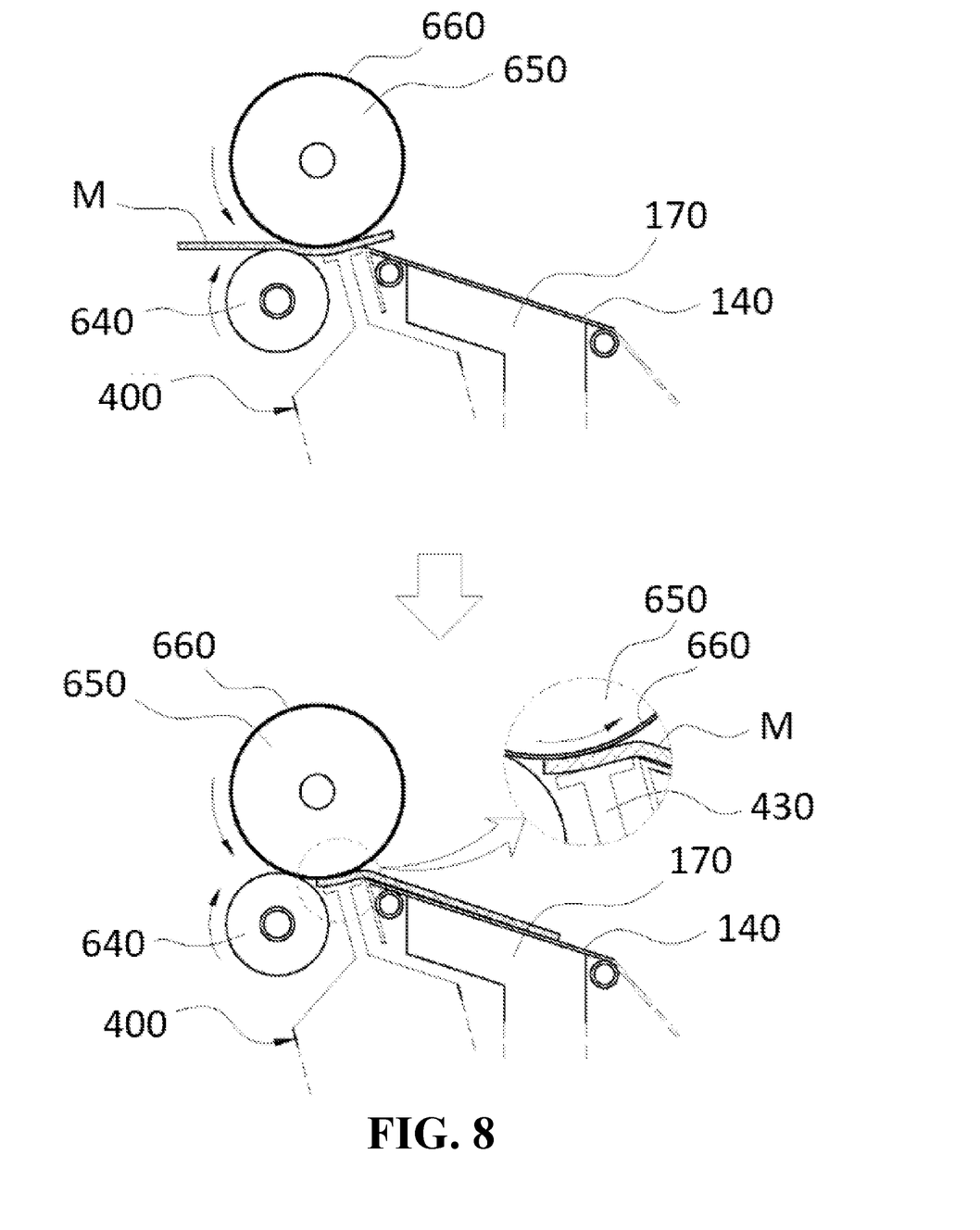
FIG. 8 is a view illustrating a situation in which a first pressing roller to which friction members are attached transfers the end part of the washed mat.

FIG. 8 is a view illustrating a situation in which the first pressing roller 650 to which friction members are attached transfers an end part of a washed mat M.

The following description will be made with reference to FIG. 8.

The guide roller 640 is configured to receive power from the drive motor 300 and transfer the washed mat rearward.

The first pressing roller 650 is disposed at the rear side of the upper part of the guide roller 640 and is configured to press a mat M transferred by the guide roller 640 to the upper side of the bottleneck part 430 while the first pressing roller 650 is in contact with the guide roller 640.

That is, since the first pressing roller 650 is configured to press the mat M to the upper side of the bottleneck part 430, the first pressing roller 650 is manufactured to have a smooth surface. When the surface of the first pressing roller 650 is manufactured to be rough, unnecessary power loss is caused while the first pressing roller 650 is in contact with the guide roller 640.

However, as shown in a lower view of FIG. 8, when a washed mat M has passed the guide roller 640 and only the end part of the mat is placed between the first pressing roller 650 and the bottleneck part 430, the end part of the mat M is sucked on the bottleneck part 430 such that the mat M is not discharged to the outside.

In this case, even when the first pressing roller 650 is in contact with the end part of the mat M, the end part of the mat M is not discharged to the outside due to the smooth surface of the first pressing roller 650.

In the end, a person is required to pull the mat M by manpower and discharge the mat M to the outside.

Accordingly, in the mat cleaning device of the present disclosure, the friction members 660 are attached on the surface of the first pressing roller 650.

That is, by attaching the friction members 660 to the surface of the smooth first pressing roller 650, the end part of the mat M of a state shown in the lower view of FIG. 8 can be discharged to the outside.

The first pressing roller 650 in contact with the guide roller 640 which is rotating is rotated due to the friction members 660 attached on the surface of the first pressing roller 650, and the friction members 66 discharge the end part of the mat M in the state of the lower view of FIG. 8 to the outside.

The friction members 660 are attached on the first pressing roller 650 by being spaced at predetermined intervals apart from each other in the longitudinal direction of the first pressing roller 650.

A non-slip tape is preferably adopted as the material of the friction members 660.

As a result, the surface of the first pressing roller 650 is formed smooth to minimize power loss, and the friction members 660 are attached on portions of the surface of the first pressing roller 650 such that the end part of the mat M in the state of the lower view of FIG. 8 can be efficiently discharged to the outside.

The present disclosure relates generally to a mat cleaning device. More particularly, the present disclosure relates to a mat cleaning device which dries a washed mat M by using hot air discharged from the vacuum pump 510 provided to remove moisture of the washed mat M such that the installation costs of the heating device are not incurred, and allows the end part of the mat M sucked on the vacuum suction means 400 to be efficiently discharged by the first pressing roller 650 to which the friction members 660 are attached.

In the above, the exemplary embodiment of the present disclosure has been illustrated and described, but the present disclosure is not limited to the specific embodiment described above. Various modifications of the embodiment may be made by those of ordinary skill in the technical field to which the invention belongs without departing from the gist of the present disclosure claimed in the claims. These modified embodiments should not be individually understood from the technical spirit or prospect of the present disclosure.

What is claimed is:

1. A mat cleaning device which washes and dries a mat, the device comprising:
    a casing which constitutes an exterior of the mat cleaning device;
    a washing water spray nozzle which is disposed on one side of the casing and configured to spray a washing water on the mat;
    a drive motor which is disposed inside the casing;
    a plurality of rollers which are rotated by the drive motor and configured to transfer and wash the mat;
    a vacuum pump which is configured to form a vacuum pressure;
    a vacuum suction which is configured to suck moisture and foreign matter on a surface of the mat by using the vacuum pressure formed by the vacuum pump;
    a centrifugation chamber which is configured to provide the vacuum pressure formed by the vacuum pump to the vacuum suction and centrifuge the moisture and the foreign matter sucked by the vacuum suction; and
    a hot air supplier which has a first end coupled with a discharge hole of the vacuum pump and has a second end disposed under the mat so as to dry the mat by using air discharged from the vacuum pump,
    wherein the vacuum suction comprises:
        a vacuum chamber which is connected to the centrifugation chamber and configured to provide suction force thereto; and
        a bottleneck which is formed on an upper part of the vacuum chamber, wherein the bottleneck is smaller in a width than the vacuum chamber, and a plurality of vacuum suction slots are formed in an upper surface of the bottleneck,
    wherein the plurality of rollers comprises:
        a guide roller which is configured to rearwardly transfer the mat, said guide roller being rotated by the drive motor; and
        a first pressing roller which is disposed at a rear side of an upper part of the guide roller and configured to press the mat transferred by the guide roller to an upper part of the bottleneck while the first pressing roller is in contact with the guide roller,
    wherein friction members are attached on a surface of the first pressing roller,
    wherein the friction members are attached on the first pressing roller by being spaced at predetermined intervals apart from each other in a longitudinal direction of the first pressing roller, and
    wherein a material of the friction members is a non-slip tape, and the surface of the first pressing roller has a predetermined smoothness level.

2. The device of claim 1, wherein the centrifugation chamber comprises:
    a first chamber coupled with the vacuum pump at an upper part of the first chamber such that the first chamber and the vacuum pump communicate with each other, with a spiral vortex guide being provided inside the first chamber;
    a second chamber, wherein an upper part of the second chamber is coupled with a vacuum tube, the vacuum tube is coupled with the vacuum suction, a first partition wall is formed between the second chamber and the first chamber, and a first through hole is formed under the first partition wall such that moisture and foreign matter centrifuged in the first chamber are introduced into the second chamber; and
    a third chamber coupled with a drainpipe at one side of the third chamber, wherein a second partition wall is formed between the third chamber and the second chamber, and a second through hole is formed under the second partition wall,
    wherein a check valve is coupled to the second through hole, and when an operation of the vacuum pump stops, the check valve is opened by a pressure of water filled in the second chamber, so that moisture and foreign matter stored in the second chamber are discharged to the drainpipe.

* * * * *